United States Patent

[11] 3,629,957

| [72] | Inventor | Saligrama C. Somashekar<br>55 West 76th St., New York, N.Y. 10023 |
|---|---|---|
| [21] | Appl. No. | 6,708 |
| [22] | Filed | Jan. 29, 1970 |
| [45] | Patented | Dec. 28, 1971 |

[54] GRAVITY-MEASURING APPARATUS
6 Claims, 5 Drawing Figs.

[52] U.S. Cl.................................................. 35/19 R, 200/61.11
[51] Int. Cl.................................................. G09b 23/10
[50] Field of Search.......................................... 35/19 R; 73/12; 273/96 R; 200/61.11, 170 A; 235/98 B

[56] References Cited
UNITED STATES PATENTS
3,320,686  5/1967  Blackburn.................... 35/19 R FOREIGN PATENTS
1,202,037  9/1965  Germany...................... 35/19 R
1,214,442  4/1966  Germany...................... 35/19 R Primary Examiner—Harland S. Skogquist
Attorney—Hane, Baxley & Spiecens ABSTRACT: Apparatus for measuring the acceleration due to gravity includes first and second mechanically operated switch means positioned one below the other on an upright rod. Each switch means is opened or closed in accordance with whether the switch means supports a ball which freely falls from the upper to the lower switch means. Both of the switch means are in a series circuit which includes an electrically operated timer.

PATENTED DEC 28 1971 3,629,957
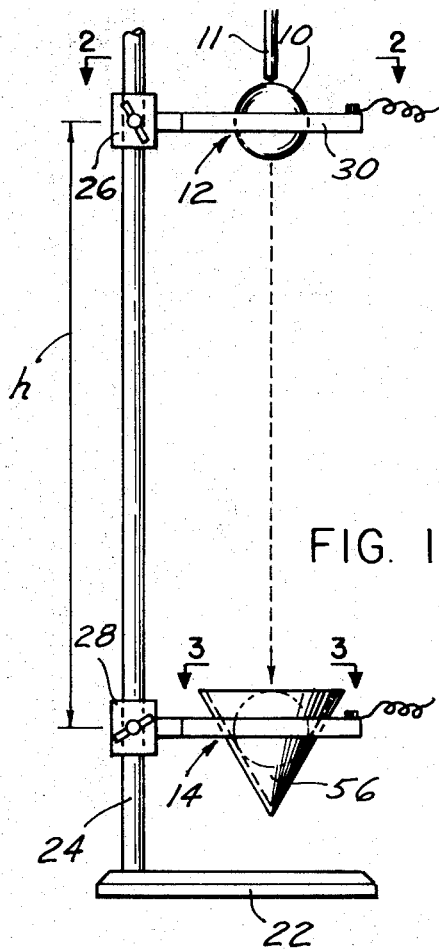
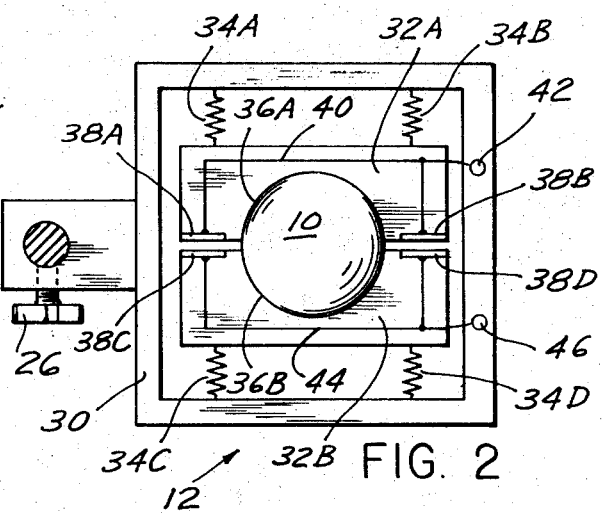
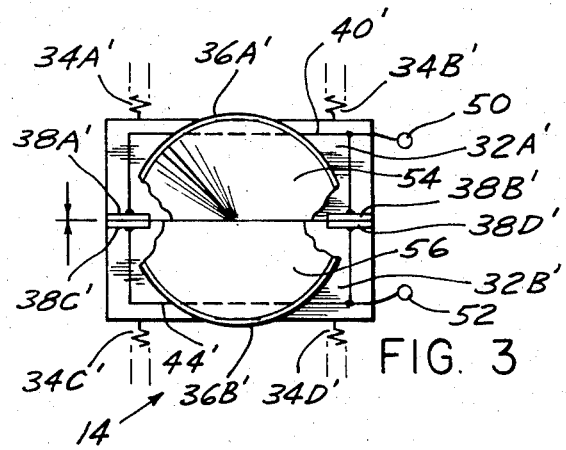
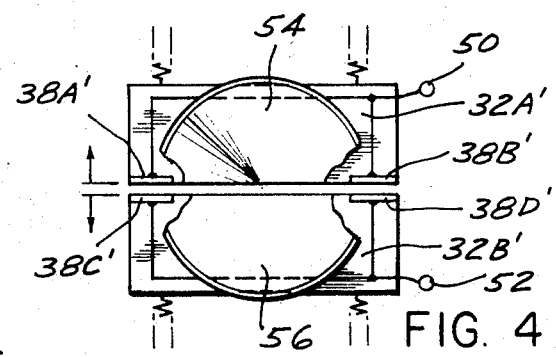
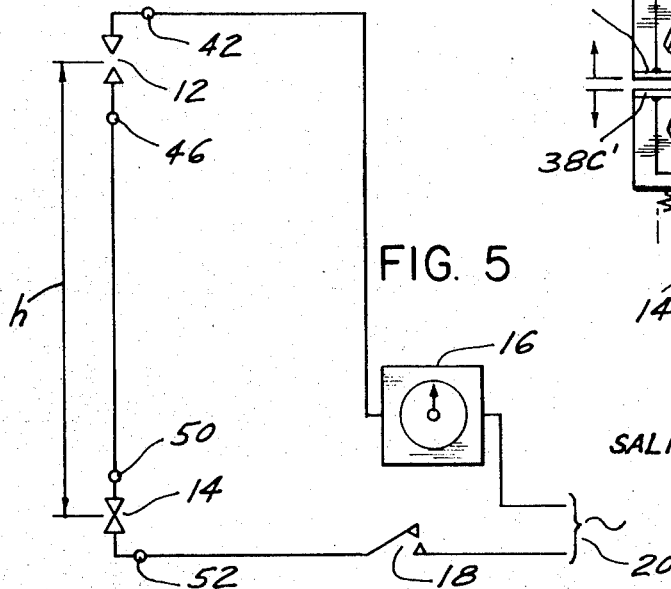
INVENTOR.
SALIGRAMA C. SOMASHEKAR
BY Hurm, Barley and Spurens
ATTORNEYS

GRAVITY-MEASURING APPARATUS

This invention pertains to physical constant measuring apparatus and more particularly to such apparatus for measuring the acceleration of gravity.

There are generally associated with the teaching of the physical sciences in the school's laboratory, sessions during which the students actually perform experiments to reinforce the classroom and textbook material. On the grammar and secondary school level, it is necessary that the experiments be very graphic and that the apparatus used in performing the experiments be simple, rugged, and safe.

One of the most fundamental constants used in physics is $g$ (the acceleration due to gravity). Therefore, any physics course should have a laboratory session concerned with the measurement of this constant. Heretofore, such experiments employed either inclined-plane devices wherein the students timed the passage of a ball between two points on the inclined plane by means of visually sighting the movement of the ball past the points while manually operating a stop watch. Clearly, such apparatus is inexact and depends on the skill of the experimenter. Other available devices require less skill from the student but are either more complex and/or fragile.

It is accordingly, an object of the invention to provide apparatus for measuring the acceleration due to gravity which is ideally suited for student laboratory experiments.

It is another object of the invention to provide such apparatus which on the one hand does not require any experimental skill of the student and on the other hand is extremely simple, rugged, and relatively exact.

Briefly, the invention contemplates apparatus for measuring the acceleration due to gravity by measuring the time of flight of a ball falling between two known levels. The apparatus comprises a first switch means including means for holding and thereafter releasing the ball. This switch means only closes after the release of the ball. There is also included a second switch means, positioned below the first switch means, for receiving the ball. The second switch means only opens after receiving the ball. The switch means are connected in series with an electric timer and a source of current to control the operation of the timer.

Other objects, features, and advantages of the invention will be apparent from the following detailed description when read with the accompanying drawings which show a preferred embodiment of the invention.

In the drawings:

FIG. 1 shows a side view of apparatus for measuring the acceleration due to gravity in accordance with the invention;

FIG. 2 shows a top view of the upper switch means when viewed along the line 2—2 of FIG. 1;

FIG. 3 shows a top view of the lower switch means before receiving a ball when viewed along the line 3—3 of FIG. 1;

FIG. 4 is the same as FIG. 3 except that it is assumed that the lower switch means has received the ball; and FIG. 5 shows the circuitry of the apparatus.

Before proceeding with the details of the apparatus, the overall operation of the apparatus will be described with the aid of FIGS. 1 and 5.

A ball 10 is placed upon upper normally closed switch means 12 causing its contacts to open. When a student now closes manual ON/OFF switch 18 and by the use of rod 11 pushes the ball downward, the ball 10 is released and freely falls to second or lower normally closed switch means 14. Switch means 12 recloses its contacts as soon as the ball has passed through it. When the ball 10 is received by lower switch means 14, the contacts of this switch means open. As shown, a source of electric current 20, switch means 12 and 14, and timer 16 are in a series circuit. When and while the ball is in free flight the contacts of the switch means 12 and 14 are closed. Hence, the series circuit is complete and timer 16 operates. As soon as the ball is received by switch means 14 and its contacts open, the series circuit is broken and timer 16 stops operating. Timer 16 therefore has recorded the elapsed time of flight of ball 10. By measuring the vertical distance $h$ between the upper switch means 12 and the lower switch means 14 and noting the elapsed time $t$ recorded by timer 16, one can calculate the acceleration due to gravity by using the formula $g=2h/t^2$.

The actual apparatus will now be described by making reference to FIGS. 1 to 4. The apparatus comprises a base 22 from which extends upwardly a rod 24. Switch means 12 is attached to rod 24 by a clamp 26; and a clamp 28 connects switch means 14 to rod 24.

As is shown in FIG. 2 switch means 12 comprises a frame 30 from which extends clamp 26. Within frame 30 are a pair of identical plates 32A and 32B of nonconductive material. The plates are supported in the plane of the frame by springs 34A and 34D which are under compression so that the opposed edges of the plates are biased to move toward each other. Each of these edges has a semicircular cutout portion 36A and 36B with radii substantially equal to the radius of ball 10. Embedded in the remaining portions of these edges are electric contactors 38A to 38D, with contactors 38A and 38B in plate 32A and contactors 38C and 38D in plate 32B. Furthermore, contactors 38A and 38B are directly opposite contactors 38C and 38D, respectively. Contactors 38A and 38B are connected by wires 40 to a terminal 42; and contactors 38C and 38D are connected by wires 44 to a terminal 46.

Ball 10 is shown supported in the cutout portions of plates 32A and 32B. In this condition the opposed contactors are separated from each other. When the student suing the handheld rod 11 pushes the ball 10, it drops and the springs 34A to 34D drive the plates 32A and 32B into abutting relationship, and contactors 38A and 38C make contact as do contactors 38B and 38D.

In FIG. 3 the main parts of lower switch means 14 are shown. Since the frame and clamp are identical to those of upper switch means 12 they have been deleted. Furthermore, since many of the remaining elements are the same as those of the switch means 12 of FIG. 2, primed reference characters will be used for similar elements and only the differences will be discussed in detail. In fact, the only difference is the addition of hemiconical surface members 54 and 56. In particular, hemiconical surface member 54 has its base edge fixed to the peripheral edge of cutout portion 36A' while hemiconical surface member 56 has its base edge fixed to the peripheral edge of cutout portion 36B'. When plates 32A' and 32B' are in abutting relation as shown in FIG. 3, the hemiconical surface members define a cone with an open base and a downwardly pointing apex (see FIG. 1) for receiving ball 10. FIG. 3 shows the configuration before receiving ball 10. In such a configuration the contactors are in contact and there is a closed circuit between terminals 50 and 52.

In FIG. 4 the switch means 14 is shown as it would be if ball 10 were resting in the cone formed by hemiconical surface members 54 and 56. The weight of the ball 10 spreads the plates 32A' and 32B' sufficiently to break the contacts of the contactors 38A' to 38D' and an open circuit exists between terminals 50 and 52.

It should be noted that the clamps 26 and 28 permit the changing of the vertical positions of switch means 12 and 14, respectively, so that various measurements can be performed to convince the student that the acceleration due to gravity is really a constant and does not depend on the distance of free fall of the ball or the vertical positions of the ends of the flight.

Although only one embodiment of the invention has been shown and described in detail there will now be obvious to those skilled in the art, many modifications and variations which satisfy the objects of the invention but do not depart from the spirit thereof as defined by the appended claims.

What is claimed is:

1. Apparatus for measuring the acceleration by gravity comprising:
   substantially a spherical body;
   a first switch means including engaging means for holding and thereafter releasing said body, said first switch means being closed only after the release of said body by said body-engaging means;

a second switch means including receiving means for said body positioned a known distance below said body-engaging means, said second switch means being opened only when said body is received by said engaging means, said second switch means comprising first and second plates of nonconductive material, said plates being positioned in the same plane with an edge of one plate opposite a corresponding edge of the other plate, said edges being provided with corresponding semicircular cutout portions, at least a portion of the remainder of said edges having an electric contact means, a hemiconical surface member fixed to each plate in the region of the cutout portions; and biasing means for biasing said plates to move toward each other so that when said body is not supported by said hemiconical surface members said electric contact means are in contact and said second switch means is closed, and when said body is supported by said hemiconical surface members said electric contact means are separated and said second switch means is open, said biasing means comprising a frame member and springs connected thereto under compression for supporting said first and second states;

an electric timer means, and a source of electric current, said first and second switch means, said electric timer means and said source of electric current being serially connected so that said timer means only operates when both of said switch means are closed.

2. The apparatus of claim 1 wherein said first switch means comprises third and fourth plates of nonconductive material, said plates being positioned in the same plane with an edge of one plate opposite a corresponding edge of the other plate, said edges being provided with correspondingly substantially semicircular cutout portions having radii substantially equal to the radius of said body, at least a portion of the remainder of said edges having an electric contact means, and means for biasing said plates to move toward each other so that when said body is not supported by said cutout portions of said plates said electric contact means are in contact and said first switch means is open and when said body is supported said electric contact means are separated and said first switch means is open.

3. The apparatus of claim 2 wherein said first switch means further comprises a first frame member and springs connected thereto under compression for supporting said third and fourth plates in said second frame member.

4. The apparatus of claim 3 further comprising a base member, an upright member extending from said base member, and first clamp means for changeably connecting said first frame member to said upright member.

5. The apparatus of claim 4 further comprising a base member, an upright member extending from said base, and first clamp means for changeably connecting said second frame member to said upright member.

6. The apparatus of claim 3 further comprising a base member, an upright member extending from said base member, first clamp means for changeably connecting said first frame member to said upright member, and second clamp means for changeably connecting said second frame member to said upright member.

* * * * *